(12) United States Patent
Terashima et al.

(10) Patent No.: US 7,865,782 B2
(45) Date of Patent: Jan. 4, 2011

(54) I/O DEVICE FAULT PROCESSING METHOD FOR USE IN VIRTUAL COMPUTER SYSTEM

(75) Inventors: Shizuki Terashima, Yokohama (JP); Yoshihiro Hattori, Yokohama (JP); Ryota Noguchi, Hadano (JP); Harumi Ooigawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 12/020,054

(22) Filed: Jan. 25, 2008

(65) Prior Publication Data

US 2008/0189570 A1 Aug. 7, 2008

(30) Foreign Application Priority Data

Jan. 30, 2007 (JP) ............................. 2007-018667

(51) Int. Cl.
*G06F 11/00* (2006.01)
(52) U.S. Cl. ............................. 714/43; 714/9; 714/57
(58) Field of Classification Search .................. 714/4, 714/9, 10, 42, 43, 57
See application file for complete search history.

(56) References Cited

U.S. PATENT DOCUMENTS

| 5,291,605 | A  * | 3/1994  | Takagi et al. ................. 710/48 |
| 7,398,432 | B2 * | 7/2008  | Arbeitman et al. ............ 714/57 |
| 7,496,790 | B2 * | 2/2009  | Arndt et al. ................... 714/24 |
| 7,539,788 | B2 * | 5/2009  | Moriki et al. ................. 710/36 |
| 7,613,847 | B2 * | 11/2009 | Kjos et al. ..................... 710/22 |
| 2002/0049869 | A1 * | 4/2002 | Ohmura et al. ............... 710/5 |
| 2004/0153853 | A1 * | 8/2004 | Moriki et al. ................. 714/43 |
| 2005/0240800 | A1 * | 10/2005 | Hashimoto .................... 714/4 |
| 2006/0064523 | A1 * | 3/2006 | Moriki et al. ................. 710/62 |
| 2006/0242643 | A1 * | 10/2006 | Belmar et al. ............... 718/100 |
| 2007/0067366 | A1 * | 3/2007 | Landis ....................... 707/205 |
| 2007/0192765 | A1 * | 8/2007 | Shimogawa et al. ........... 718/1 |
| 2007/0260910 | A1 * | 11/2007 | Jain et al. ..................... 714/4 |
| 2008/0114916 | A1 * | 5/2008 | Hummel et al. ............. 710/266 |
| 2008/0115012 | A1 * | 5/2008 | Jann et al. .................... 714/38 |
| 2009/0106754 | A1 * | 4/2009 | Liu et al. ....................... 718/1 |
| 2009/0112972 | A1 * | 4/2009 | Liu ............................. 709/203 |

FOREIGN PATENT DOCUMENTS

JP 2006-085543 3/2006

* cited by examiner

*Primary Examiner*—Joshua A Lohn
(74) *Attorney, Agent, or Firm*—Brundidge & Stanger, P.C.

(57) ABSTRACT

An input/output (I/O) device fault processing method for executing, without contradiction, fault recovery processing of a physical I/O device which is commonly used or shared by a plurality of virtual computers in such a way that no influence is exerted on a virtual computer which does not presently use the shared I/O device is disclosed. A hypervisor performs fault monitoring of the physical I/O device. Upon occurrence of an operation failure, this failure is detected and notified to a virtual management computer. In responding to receipt of the notice, the virtual management computer performs the fault recovery processing of the physical I/O device.

2 Claims, 3 Drawing Sheets

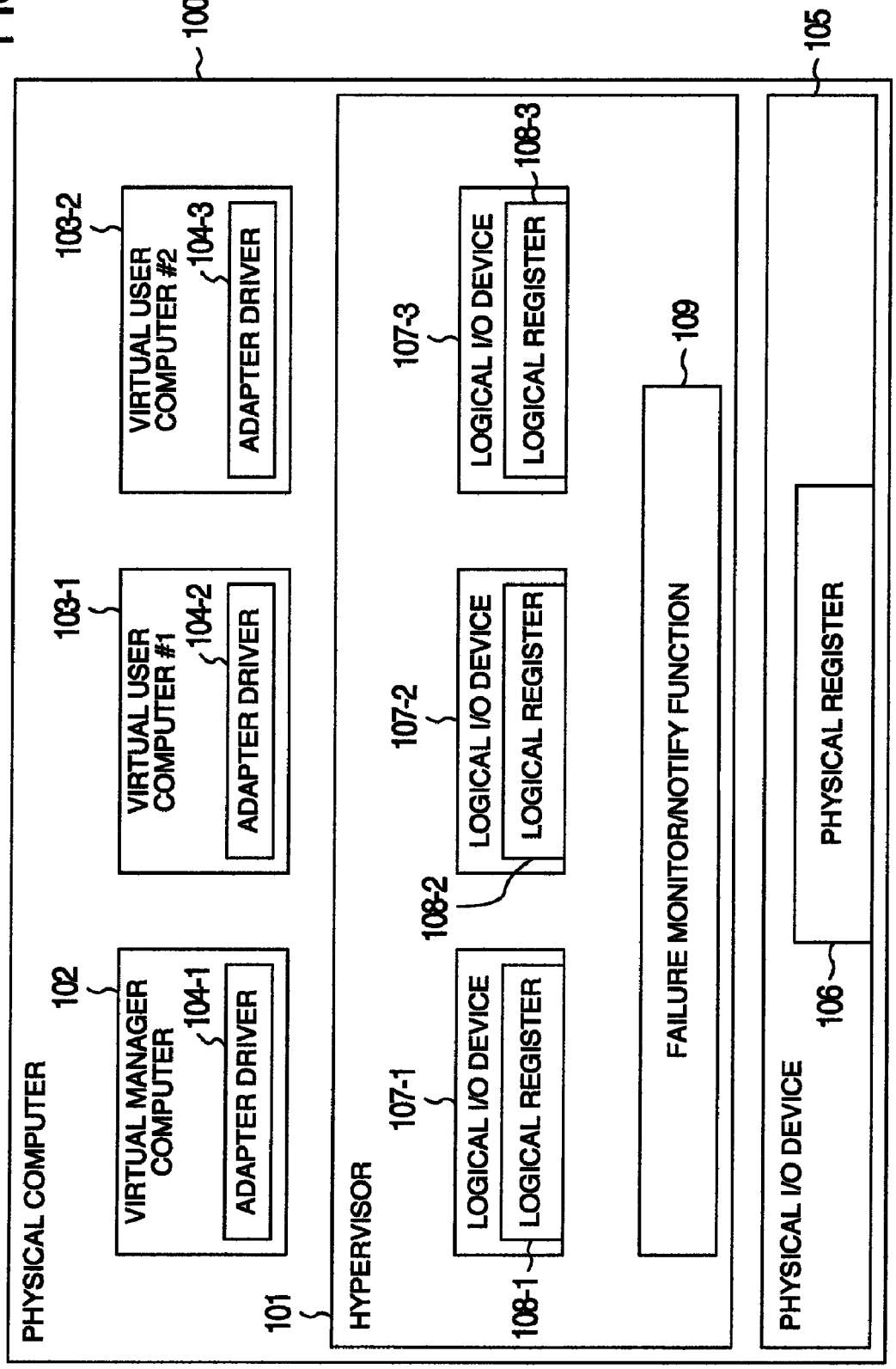

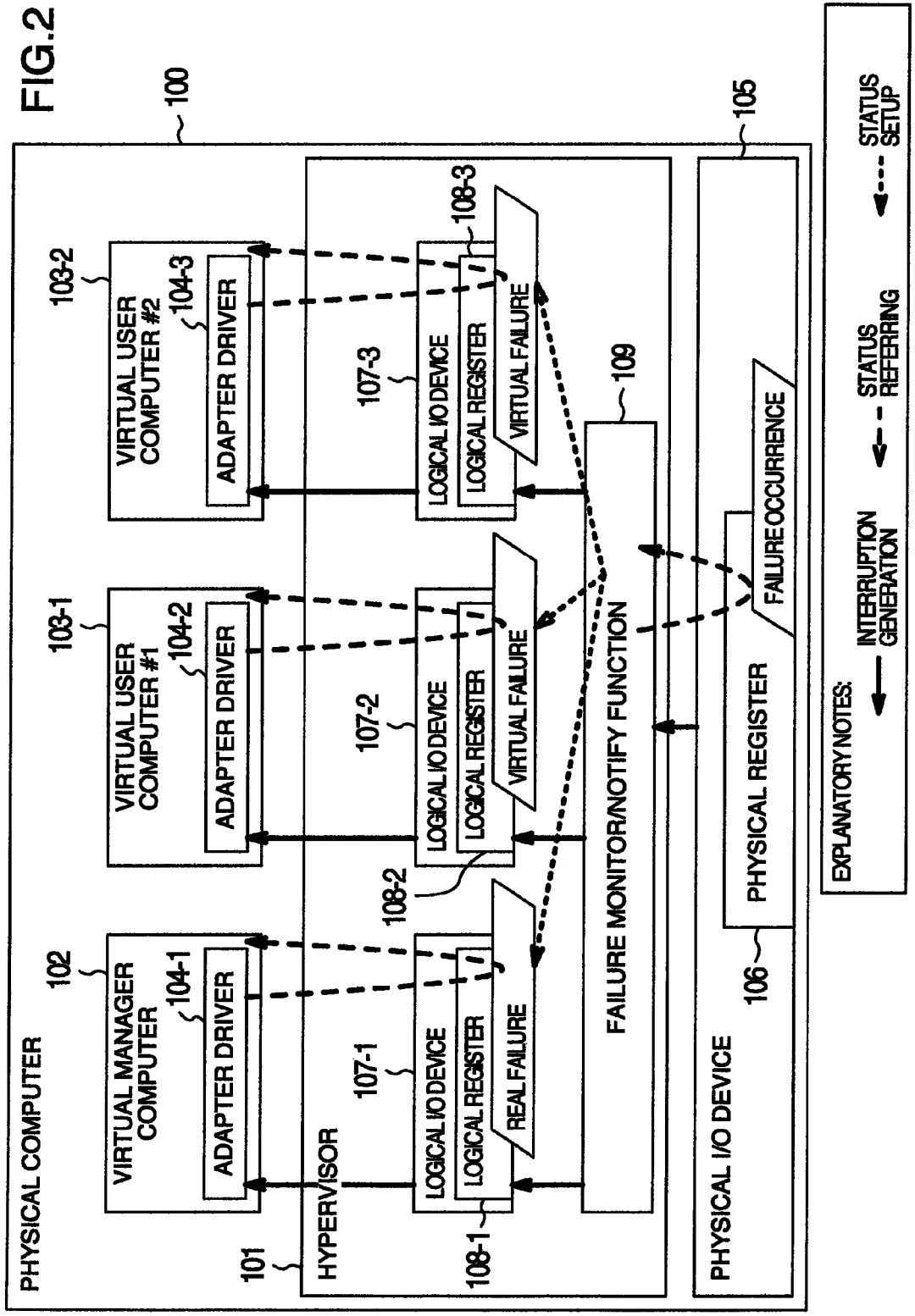

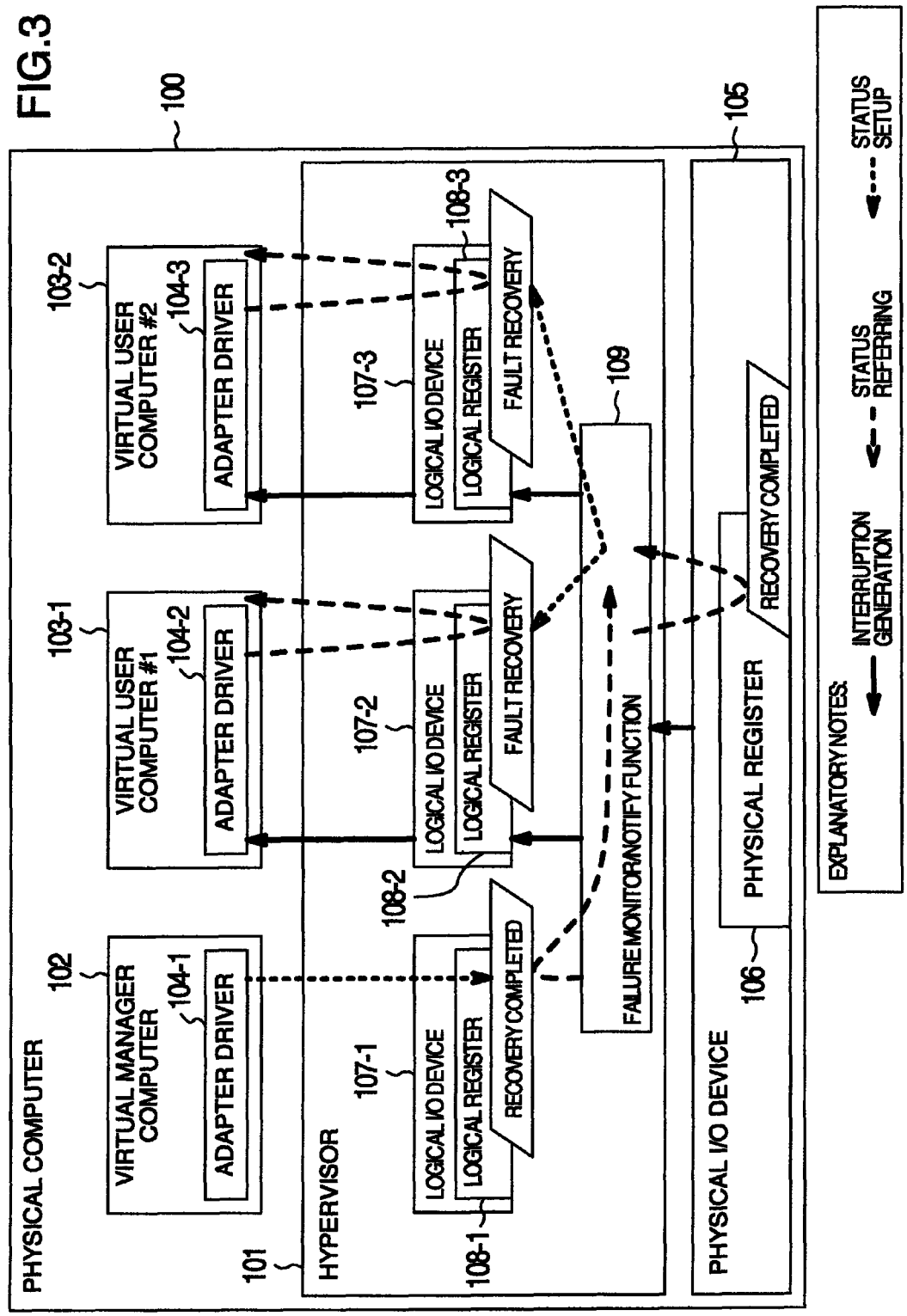

I/O DEVICE FAULT PROCESSING METHOD FOR USE IN VIRTUAL COMPUTER SYSTEM

INCORPORATION BY REFERENCE

The present application claims priority from Japanese application JP2007-018667 filed on Jan. 30, 2007, the content of which is hereby incorporated by reference into this application.

BACKGROUND OF THE INVENTION

1. Field of the Invention

The present invention relates generally to an input/output (I/O) device control method adaptable for use in a virtual computer system. More particularly but not exclusively, this invention relates to the fault processing or handling of a physical I/O device which is used in common or "shared" as logical I/O devices on a plurality of virtual computers.

2. Description of Related Art

The shared use of a physical I/O device in a virtual computer system is achievable in such a way that a hypervisor is employed to divide for shared use the physical I/O device into several logical I/O devices, wherein control is provided to assign the right of execution to a virtual computer which has an adequate device driver that controls the I/O device. In ordinary I/O operations, a register of logical I/O device is allocated to the physical I/O device while using as an I/O data region a logical memory space on each virtual computer using its own logical I/O device whereby a logical separation-capable scheme is utilizable. However, in fault recovery processing of I/O device upon occurrence of a hardware (H/W) failure, it becomes inevitable to perform a control operation by a specific device driver corresponding to such the I/O device. In this case, if an attempt is made to simply perform the fault recovery processing based on the I/O device driver control available on the virtual computer, unwanted task collision can take place because of the fact that all the virtual computers which are presently using the shared I/O device behave to execute the fault recovery processing at a time. To avoid this risk, the hypervisor is designed to perform the processing tasks that have been executed by the device driver in the prior art, including but not limited to I/O halt relative to all the I/O device-sharing virtual computers, fault recovery processing for I/O adapter, and I/O restarting with respect to every I/O device-sharing virtual computer, thereby making it possible to provide the shared I/O device for the virtual computers without suffering from any possible contractions. An exemplary technique concerning the I/O device sharing architecture for virtual computers is disclosed in JP-A-2006-85543.

However, designing the hypervisor to have therein the device control sequence is technically equivalent to transplanting one function of the device driver corresponding to such I/O device within the hypervisor. This approach further requires proper adaptation to the current versions of device driver, firmware and hardware of the I/O device. This in turn makes it necessary for the hypervisor to keep track of the functionality, once at a time, whenever a new version of I/O device is developed. This would result in the lack of the transparency of the physical I/O device and the device driver on virtual computer in the virtual computer system, which leads to an appreciable decrease in efficiency of hypervisor development. Further, in view of the fact that the fault recovery processing is performed by the hypervisor which is expected to control all of the virtual computers involved, the above-stated approach is encountered with the risk as to a significant decrease in processing performance with respect to a virtual computer which does not presently use the shared I/O device.

When using the shared physical I/O device by more than two virtual computers, a need is felt to perform, in I/O device virtualization control, arbitration control for controlling the physical I/O device with an adapter driver, which is the on-virtual-computer device driver accessible from a plurality of ones in the course of the physical I/O device fault recovery processing. Thus, overhead of the I/O device virtualization control poses a serious bar to establishment of the shared use.

SUMMARY OF THE INVENTION

It is therefore an object of the present invention to provide an approach to performing without contradiction the fault recovery processing of a shared I/O device in a virtual computer system and also minimizing the need for the function tracking of a hypervisor to be done once at a time whenever a new version of I/O device is developed, while at the same time avoiding performance degradation of a virtual computer which is not using the shared I/O device in the process of executing the fault recovery processing.

In accordance with one aspect of this invention, an I/O device fault processing method for use in a virtual computer system is provided, which is characterized in that a hypervisor performs the monitoring of failure of a physical I/O device and notifies, upon occurrence of a failure at the physical I/O device, notifies a virtual management computer of the detection of such failure occurred, and in that the virtual management computer is operatively responsive to receipt of the notice for performing fault recovery processing of the physical I/O device.

According to the invention, the I/O device fault processing is performed by a single virtual management computer. Thus it is possible to avoid task conflict of the fault recovery processing. In addition, as the I/O device specialized for fault processing is executed by an adapter drive on the virtual management computer, it is possible to lessen the influence on a virtual computer which does not share the I/O device of interest.

Furthermore, in view of the fact that what is required for processing sequence specialized in the I/O device is to merely use its corresponding device driver on the virtual management computer even at every stage of I/O device development. Therefore the function which the hypervisor must keep track of is failure detection/notifying functionality only, then it is possible to retain the transparency of the device driver and I/O device and also to lower the dependency of the hypervisor on the version of I/O device (hardware, firmware, and/or adapter driver), thereby making it possible to improve the development efficiency of the hypervisor.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram schematically showing a system configuration for realizing I/O device fault processing on a plurality of virtual computers in accordance with one embodiment of the present invention.

FIG. 2 is a diagram showing a process for transferring physical I/O device failure up to the virtual computers.

FIG. 3 is a diagram showing a recovery notification process with respect to virtual user computers after completion of the fault recovery processing at the virtual management computer.

DETAILED DESCRIPTION OF THE INVENTION

A currently preferred embodiment of this invention will be described with reference to the accompanying figures of the drawing below.

FIG. 1 illustrates, in schematic block diagram form, a configuration of a physical computer 100 for use in a virtual computer system in accordance with one embodiment of the invention. As shown herein, the physical computer 100 includes a hypervisor 101 and a physical input/output (I/O) device 105, which is controlled by the hypervisor as a commonly used or "shared" device, along with a virtual computer 102 for management, virtual computers 103-1 and 103-2 for users, and logical I/O devices 107-1 to 107-3 to be used by the virtual computers.

The physical I/O device 105 which is built in the physical computer 100 has a physical register 106, for providing virtually divided resources in the hypervisor 101, such as the logical I/O device 107-1 which has a logical I/O device register 108-1, logical I/O device 107-2 that has a logical I/O device register 108-2, and logical I/O device 107-3 having a logical I/O device register 108-3. The virtual management computer 102 has an adapter driver 104-1 which uses the logical register 108-1. The virtual user computer 103-1 has its adapter driver 104-2 which uses the logical register 108-2. The virtual user computer 103-2 has an adapter driver 104-3 that uses the logical register 108-3.

FIG. 2 shows details of the configuration of FIG. 1, for explanation of a process of transferring a notice indicative of failure occurring at the physical I/O device 105 toward the virtual management computer 102 and the virtual user computers 103-1 and 103-2 under the control of the hypervisor 101.

Upon occurrence of an operation failure at the physical I/O device 105, failure information is set in the physical register 106. With an interruption from the physical I/O device 105 being as a trigger, a failure monitoring/notifying function module 109 of the hypervisor 101 gives access to the physical register 106 for checking a present status of it to thereby detect as fault generation the presently occurring failure of the physical I/O device 105.

The failure monitoring/notifying function module 109 of the hypervisor 101 sets a status indicative of the real failure in the logical register 108-1 and generates an interruption with respect to the virtual management computer 102 among the plurality of virtual computers involved. In addition, for the virtual user computers 103-1 and 103-2, it sets a status indicative of virtual failure in the logical registers 108-2 and 108-3, and generates an interruption.

The adapter drivers on the virtual manager computer 102 and virtual user computers 103 operate in a way such that each makes reference to the status of its corresponding logical register 108 with acceptance of the interruption being as a trigger therefor and then executes fault recovery processing in responding to receipt of a report of real failure status in the driver control of virtual manager computer 102 or performs in response to receipt of a report of virtual failure status the handling of I/O drive inhibition in the driver control of virtual user computer 103.

FIG. 3 shows a notification and control process of the fault recovery of the physical I/O device 105, which is performed by the virtual manager computer 102 as post-processing after completion of the process of FIG. 2.

When The hypervisor 101 detects that the status of logical register 108-1 by means of the adapter driver 104-1 of virtual manager computer 102 becomes recovery completion or, alternatively, when it makes sure that the status became recovery completion by referring to the physical register 106 with the interruption from the physical I/O device 105 being as a trigger, the hypervisor 102 recognizes that the fault recovery has been completed at the adapter driver 104-1 of the virtual manager computer 102.

After the fault recovery recognition, the hypervisor 101 sets the status of each of the logical registers 108-2 and 108-3 of virtual user computers 103-1 and 103-2 at a value indicating completion of the fault recovery and then generates an interruption whereby it is recognized by the adapter drivers 104-2 and 104-3 of virtual user computers 103-1 and 103-2 that the I/O device was fault recovered successfully so that the I/O drive inhibition is canceled, resulting in the I/O drive becoming restarted.

With the embodiment of this invention, it is possible to realize the fault recovery processing that is secured by the I/O device-dedicated device driver unique to the virtual computer system, thereby enabling prevention of performance degradation with respect to a virtual computer that is not using the shared I/O device. Thus it becomes possible to provide the intended virtual I/O device of high quality with enhanced stability.

Another advantage lies in improvement of the efficiency of product development for I/O device virtualization of virtual computers. This can be said because it is no longer required to install in the hypervisor any I/O device-dependent driver control mechanism due to the function tracking of I/O device and adapter driver.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An input/output (I/O) device fault processing method of a virtual computer system having a plurality of virtual computers operative to run on a physical computer under control of a hypervisor, said plurality of virtual computers including a plurality of virtual user computers to be provided to users and a virtual management computer, and a physical I/O device for shared use by said plurality of virtual user computers under control of the hypervisor, wherein said method comprises the steps of:

causing said hypervisor to perform fault monitoring of said physical I/O device and, upon occurrence of a failure at said physical I/O device, send a notice of failure detection to said virtual management computer; and causing said virtual management computer to perform fault recovery processing of said physical I/O device in response to receipt of the notice, wherein upon occurrence of failure of said physical I/O device, said hypervisor sends a failure detection notice to said plurality of virtual user computers, and wherein the virtual user computers are responsive to receipt of the notice for performing I/O drive inhibition, wherein said physical I/O device has a physical register for setup of fault information, wherein said hypervisor has in units corresponding to respective virtual computers a plurality of logical registers each corresponding to said physical register in order to perform virtualization control of said physical I/O device, and wherein said hypervisor operates, upon occurrence of failure at said physical I/O device, to set up a status indicative of real failure in the logical register for use with said virtual management computer based on a status being set in said physical register and then notify the status to said virtual management computer while simultaneously setting a status indicative of virtual failure in the logical registers used for said virtual user computers for notification to said virtual user computers.

2. A virtual computer system having a plurality of virtual computers operative to run on a physical computer under control of a virtual computer control means, said plurality of virtual computers including a plurality of virtual user computers to be provided to users and a virtual management computer, and a physical input/output (I/O) device for shared use by said plurality of virtual user computers under control of the virtual computer control means, wherein said virtual computer control means comprises monitoring means for performing fault monitoring of said physical I/O device and first notifying means for sending, upon occurrence of a failure at said physical I/O device, a notice of failure detection to said virtual management computer, and said virtual management computer responsive to receipt of the notice includes recovery processing means for performing fault recovery processing of said physical I/O device, wherein said virtual computer control means further includes second notifying means for sending, upon occurrence of failure of said physical I/O device, a failure detection notice to said plurality of virtual user computers, and wherein each said virtual user computer has inhibition means for performing I/O drive inhibition in response to receipt of the notice, wherein said physical I/O device has a physical register for setup of fault information, wherein said virtual computer control means has in units corresponding to respective virtual computers a plurality of logical registers each corresponding in function to said physical register in order to perform virtualization control of said physical I/O device, and wherein said virtual computer control means includes first notifying means responsive to occurrence of failure of said physical I/O device for setting up a status indicative of real failure in the logical register for use with said virtual management computer based on a status as set in said physical register and for notifying the status to said virtual management computer, and second notifying means for setting a status indicative of virtual failure in the logical registers for use with said virtual user computers and for notifying the status to said virtual user computers.

* * * * *